United States Patent [19]

Kane et al.

[11] 4,300,876

[45] Nov. 17, 1981

[54] APPARATUS FOR FLUIDICALLY ATTENUATING FILAMENTS

[75] Inventors: John L. Kane; Vikas M. Nadkarni, both of Newark, Ohio

[73] Assignee: Owens-Corning Fiberglas Corporation, Toledo, Ohio

[21] Appl. No.: 99,059

[22] Filed: Dec. 12, 1979

[51] Int. Cl.³ .............................................. D01D 5/00
[52] U.S. Cl. ........................................ 425/66; 19/299; 28/240; 65/7; 65/16; 264/210.8; 425/72 S
[58] Field of Search ................... 65/5, 16, 7; 264/12, 264/176 F; 425/72 S, 7, 66; 19/299; 28/240

[56] References Cited

U.S. PATENT DOCUMENTS

| 2,189,822 | 2/1940 | Thomas et al. ........................ 65/5 |
| 2,224,466 | 12/1940 | Baker et al. ......................... 65/16 |
| 2,331,945 | 10/1943 | Pazsiczky et al. .................... 65/5 |
| 2,578,101 | 12/1951 | Stalego .............................. 65/16 |
| 2,774,630 | 12/1956 | Henry et al. ....................... 299/140 |
| 3,021,558 | 2/1962 | Roberson ............................. 65/5 |
| 3,049,751 | 8/1962 | Stalego ............................... 65/7 |
| 3,224,852 | 12/1965 | Stalego .............................. 65/16 |
| 3,283,039 | 11/1966 | Walz et al. ......................... 264/12 |
| 3,352,653 | 11/1967 | Speth ................................ 65/16 |
| 3,544,078 | 5/1968 | Stupakis ............................ 264/12 |
| 3,547,610 | 12/1970 | Holman .............................. 65/7 |
| 3,621,531 | 7/1969 | Feltgen et al. ....................... 65/16 |
| 3,681,169 | 8/1972 | Wiquel ............................. 425/72 S |
| 3,802,817 | 4/1974 | Matsaki et al. .................... 425/72 S |
| 3,836,346 | 9/1974 | Stalego .............................. 65/16 |
| 3,849,241 | 11/1974 | Butin et al. ..................... 264/176 F |
| 4,150,937 | 4/1979 | Pelagio et al. .................. 264/176 Z |

FOREIGN PATENT DOCUMENTS

| 685937 | 5/1964 | Canada ............................. 264/12 |
| 848990 | 9/1952 | Fed. Rep. of Germany ............ 65/5 |
| 2618406 | 11/1977 | Fed. Rep. of Germany ... 264/210.6 |
| 49-4026 | 1/1974 | Japan .............................. 264/126 |
| 6616574 | 5/1967 | Netherlands ....................... 264/12 |
| 669668 | 4/1952 | United Kingdom .................... 65/5 |
| 928865 | 6/1963 | United Kingdom .................... 65/5 |
| 371178 | 11/1973 | U.S.S.R. ........................... 65/16 |
| 494471 | 12/1975 | U.S.S.R. ........................... 264/12 |

Primary Examiner—Jay H. Woo
Attorney, Agent, or Firm—Ronald C. Hudgens; Robert F. Rywalski; Greg Dziegielewski

[57] ABSTRACT

Apparatus for fluidically attenuating streams of molten material into filaments is provided comprising; a base having a first chamber and a recess separated by a wall having a plurality of apertures therethrough, said first chamber being adapted to receive a fluid; a first member having a first arcuate surface and a distal end, the first member being adapted to be joined to said base such that first arcuate surface is adjacent said recess and said apertures of said base; a second member having a second arcuate surface, a head region, and a third arcuate surface, said head region being located intermediate and contiguous with said second and third arcuate surfaces, said second member being joined to said base such that said second arcuate surface is positioned adjacent said recess and said apertures of said base such that said first arcuate surface, said second arcuate surface and said head region form a smoothly converging passageway, the head region being positioned relative to the distal end to form an outlet through which said fluid is moved, said third arcuate surface being adapted to control the moving fluid issuing from said outlet, wherein the contraction ratio of the cross-sectional area of the inlet section to the cross-sectional area of the outlet section of the converging passageway is within the range of values from about 150 to about 750 to 1.

7 Claims, 5 Drawing Figures

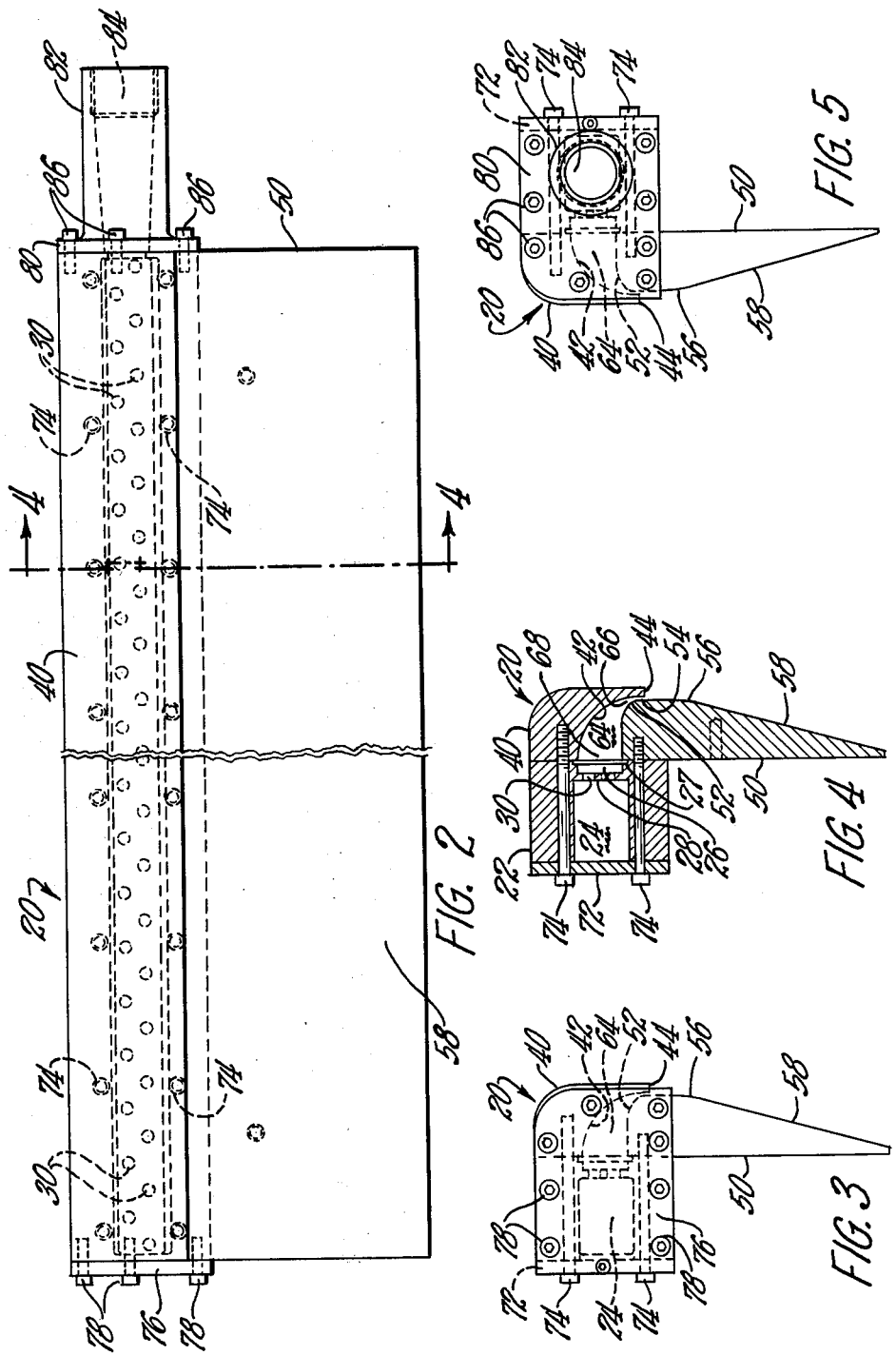

APPARATUS FOR FLUIDICALLY ATTENUATING FILAMENTS

TECHNICAL FIELD

The invention disclosed herein relates to improved apparatus for fluidically attenuating streams of molten material into filaments.

BACKGROUND ART

Gaseous blasts have been used to attenuate streams of molten material, such as glass or polymers into filaments for many years. One problem with previous blowers, especially those having a very long and narrow outlet, is associated with the need for a uniform velocity profile presented by the moving gas to the molten material to uniformly attenuate the streams into filaments which has been difficult to obtain. The need is especially critical in systems wherein continuous filaments of substantially equal diameters are desired. These problems are greatly magnified when high velocities, for example those approaching sonic velocity, are employed.

DISCLOSURE OF INVENTION

This invention provides apparatus for fluidically attenuating streams of molten material into filaments comprising; a base having a first chamber and a recess separated by a wall having a plurality of apertures therethrough, said first chamber being adapted to receive a fluid; a first member having a first arcuate surface and a distal end, the first member being adapted to be joined to said base such that first arcuate surface is adjacent said recess and apertures of said base; a second member having a second arcuate surface, a head region, and a third arcuate surface, said head region being located intermediate and contiguous with said second and third arcuate surfaces, said second member being joined to said base such that said second arcuate surface is positioned adjacent said recess and apertures of said base such that said first arcurate surface, said second arcuate surface and said head region form a smoothly converging passageway having an inlet section at said base, the head region being positioned relative to the distal end to form an outlet section through which said fluid is moved, said third arcuate surface being adapted to control the moving fluid issuing from said outlet, wherein the contraction ratio of the cross-sectional area of the inlet section to the cross-sectional area of the outlet section of the converging passageway is within the range of values from about 150 to about 750 to 1.

BRIEF DESCRIPTION OF THE DRAWINGS

FIG. 2 is a front elevational view of the fluidic attenuation means shown in FIG. 1.

FIG. 3 is a side view of the fluidic attenuation means shown in FIG. 4.

FIG. 4 is a cross-sectional view of the fluidic attenuation means shown in FIG. 2 taken along view 4—4.

FIG. 5 is an end view of the fluidic attenuation means shown in FIG. 2.

BEST MODE OF CARRYING OUT THE INVENTION

Figure 1:
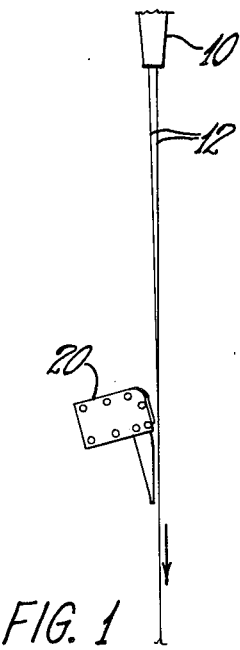
FIG. 1 is a semi-schematic side elevational view of a fiber forming operation employing a fluidic attenuating device according to the principles of this invention.

As shown in FIG. 1, feeder 10 supplies a plurality of streams of molten material, such as glass or polymers such as polystyrene, polyproplene and the like, which are attenuated into filaments 12 by the high velocity stream of gas supplied by fluidic attentuation means or blower 20. The staple and/or continuous filaments 12 can be collected into a mat or tow, as desired, by any suitable collection means, such as a conveyor (not shown) as is known in the art.

As shown in FIGS. 2, 3, 4 and 5, fluidic attenuation means or blower 20 is comprised of base 22, first member 40, second member 50, and end caps 76 and 80.

Base 22 is comprised of a first chamber 24 and a recess 26 separated by a perforated wall 28 having a plurality of substantially equal spaced apart apertures 30 extending therethrough to provide communication between first chamber 24 and recess 26.

First member 40 is comprised of a body having a first arcuate surface 42 contiguous with distal end or lip 44.

Second member 50 is comprised of a body having a second arcuate surface 52, a straight or head region 54 and a third arcuate surface 56. Head region 54 is contiguous with and intermediate second and third arcuate surfaces 52 and 56, and third arcuate surface 56 is contiguous with extension 58.

First member 40 is adapted to be joined to base 22 such that the first arcuate surface 42 is adjacent recess 26 and apertures 30 of base 22. Second member 50 is adapted to be joined to base 22 such that the second arcuate surface 52 is positioned adjacent said recess 26 and apertures 30 of base 22 opposite first arcuate surface 42 to form a smoothly converging passageway 64 having an outlet or nozzle section 66 and inlet section 68.

Outlet or nozzle section 66 is defined by the inner surface of distal end or lip 44 and the straight or head region 54 of the first and second members, 40 and 50, respectively, and first and second end caps 76 and 80.

Inlet section 68 is defined by first arcuate surface 42, second arcuate surface 52, and end caps 76 and 80 at the plane at which first member 40 and second member 50 are joined to base 22.

Base plate 72 is fastened to base 22 at first chamber 24 to form a preplenum. As shown in the drawings, base plate 72, base 22, first member 40 and second member 50 are joned together by conventional fasteners, such as screws 74. First end cap 76 and second end cap 80 are fastened to the sides of base 22, first member 40 and second member 50 by means of fasteners 78 and 86, such as conventional screws, to complete blower 20.

As can be seen in FIGS. 2 and 5, second end cap 80 includes boss 82 having a supply port 84 extending therethrough which is adapted to be connected to a suitable source of pressurized fluid, such as air (not shown).

It has been determined that passageway 64 should be of a smoothly converging configuration leading to the nozzle section 66 defined by the inner surface of lip 44 and head region or surface 54 which are substantially parallel with respect to each other for a distance at least twice the length of the space between lip 44 and head surface 54. It is preferred that the distance of substantial parallelism be at least 8 times the space between lip 44 to promote the desired uniform velocity profile over the length of blower 20.

In operation, pressurized air is supplied to the first chamber 24 or preplenum along a path substantially transverse to the axes of the apertures in wall 28 through supply port 84. The air flows from the first chamber 24 through apertures 30 into converging passageway 64 and out nozzle section 66. Preferably, the air is supplied at a pressure sufficient to move the air through nozzle 66 at sonic velocity. Apertures 30 serve to distribute the air substantially evenly along the length and width of passageway 64. For blowers designed according to the principles set forth in this invention, sonic velocities have been achieved for supply pressures greater than 15 PSI gauge.

As the moving fluid exits nozzle section 66, the fluid encounters third arcuate surface 56 and extension 58. Since third arcuate surface 56 and extension 58 are oriented to recede from the original path of the fluid flowing through nozzle section 66, the air flows along surface 56 and extension 58 according to the Coanda effect.

In operation, blower 20 is oriented such that the filaments 12 move entrained in the high velocity air moving along surface 56 and extension 58.

According to the principles of this invention, the contraction ratio or the ratio of the cross-sectional area of the inlet section 68 to the cross-sectional area of the outlet section 66 of the converging passageway 64 is within the range of values from about 150 to about 750 to 1. Preferably, the contraction ratio is a value within the range from about 250 to about 550 to 1.

For the purposes of this invention, the cross-sectional areas are areas taken in a plane substantially normal to the general path of fluid flow containing a point at the particulate region. For the purposes of this invention, the cross-sectional area of the inlet section 68 is defined at the region wherein the first and second members 40 and 50 are joined to base 22. Similarly, the cross-sectional area of the outlet section 66 is the area between the inner surface of lip 44 and head surface 54, generally at the most extreme point of lip 44.

In operation, it has been found that the ratio of the cross-sectional area of the inlet section 68 of the converging passageway to the total cross-sectional area of said apertures 30 through wall 28 is a value within the range from about 8 to about 18 to 1, with the range from about 10 to about 14 to 1 being preferred.

It has been shown that the principles and relationships defined in this design are effective for extremely long blowers. For example, it has been shown that blowers having a ratio of the length (i.e. distance between end caps 76 and 80) of the outlet section 66 to the width of the outlet section or distance between lip 44 and second member 50 is effective for values within the range from about 32,500 to about 2,500 to 1.

If necessary, blower 20 can accommodate a difuser screen adapted to seat in groove 27 and base 22 between first and second members 40 and 50 to more uniformly distribute the fluid or air moving therethrough. Generally, the cross-sectional open area of the screen would be about the same as the total cross-sectional area of apertures 30 but the holes or perforations of the screen would be substantially smaller and more numerous.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous inorganic or organic filaments.

We claim:

1. Apparatus for fluidically attenuating streams of molten material into filaments comprising:
   a base having a first chamber and a wall having a plurality of apertures therethrough in communication with said chamber, said first chamber being adapted to receive a fluid;
   a first member having a first arcuate surface and a distal end, the first member being adapted to be joined to said base such that first arcuate surface is adjacent said apertures;
   a second member having a second arcuate surface, a head region, and a third arcuate surface, said head region being located intermediate and contiguous with said second and third arcuate surfaces, said second member being joined to said base such that said second arcuate surface is positioned adjacent said apertures such that said first arcuate surface, said second arcuate surface and said head region form a smoothly converging passageway having an inlet section, the head region being positioned relative to the distal end to form an outlet section of said conveying passageway through which said fluid is moved, said third arcuate surface being adapted to control the moving fluid issuing from said outlet section, wherein the contraction ratio of the cross-sectional area of the inlet section to the cross-sectional area of the outlet section of the converging passageway is within the range of values from about 150 to about 750 to 1.

2. The apparatus of claim 1 wherein said ratio is within the range of values from about 250 to about 550 to 1.

3. The apparatus of claims 1 or 2 wherein the supply ratio of the cross-sectional area of the inlet section of the converging passageway to the total cross-sectional area of said apertures through said wall is a value within the range from about 8 to about 16 to 1.

4. The apparatus of claim 3 wherein said supply ratio is a value within the range from about 10 to about 14 to 1.

5. The apparatus of claim 4 wherein the interior surface of the nozzle region of said second member and said inner surface of said distal end of said first member are substantially parallel for a distance at least twice the length of the space between said distal end and said head region.

6. The apparatus of claim 5 wherein said distance is at least 8 times said space.

7. Apparatus for fluidically attenuating streams of molten material into filaments comprising:
   a base having a first chamber and a wall having a plurality of apertures therethrough in communication with said chamber, said first chamber being adapted to receive a fluid;
   a first member having a first arcuate surface and a distal end, the first member being adapted to be joined to said base such that first arcuate surface is adjacent said apertures;
   a second member having a second arcuate surface, a head region, and a third arcuate surface, said head region being located intermediate and contiguous with said second and third arcuate surfaces, said second member being joined to said base such that said second arcuate surface is positioned adjacent said apertures such that said first arcuate surface, said second arcuate surface and said head region form a smoothly converging passageway having an inlet section, the head region being positioned relative to the distal end to form an outlet section of said conveying passageway through which said fluid is moved, said third arcuate surface being adapted to control the moving fluid issuing from said outlet section, wherein the contraction ratio of the cross-sectional area of the inlet section to the cross-sectional area of the outlet section of the converging passageway is within the range of values from about 150 to about 750 to 1.0, wherein the supply ratio of the cross-sectional area of the inlet section of the converging passageway to the total cross-sectional area of said apertures through said wall is a value within the range from about 8 to about 16 to 1, wherein the interior surface of the nozzle region of said second member and said inner surface of said distal end of said first member are substantially parallel for a distance at least twice the length of the space between said distal end and said head region and wherein the ratio of the length of the outlet section to width of the outlet section is within the range from about 32,500 to about 2,500 to 1.

* * * * *